United States Patent

Schulte

Patent Number: 5,860,449
Date of Patent: Jan. 19, 1999

[54] BACK-FLOW CHECK VALVE

[75] Inventor: Franz Schulte, Lippstadt, Germany

[73] Assignee: A. Kayser Automotive Systems GmbH, Einbeck, Germany

[21] Appl. No.: 592,349

[22] PCT Filed: Jun. 3, 1995

[86] PCT No.: PCT/EP95/02115

§ 371 Date: Feb. 7, 1996

§ 102(e) Date: Feb. 7, 1996

[87] PCT Pub. No.: WO95/34776

PCT Pub. Date: Dec. 21, 1995

[30] Foreign Application Priority Data

Jun. 13, 1994 [DE] Germany ............... 44 20 586.4

[51] Int. Cl.[6] ............................................. B01D 35/02
[52] U.S. Cl. ................ 137/550; 137/512.15; 137/854
[58] Field of Search ..................... 137/550, 854, 137/512.15

[56] References Cited

U.S. PATENT DOCUMENTS

| | | |
|---|---|---|
| 1,548,008 | 7/1925 | Joyce et al. .................. 137/550 |
| 2,547,377 | 4/1951 | De Juhasz . |
| 3,297,260 | 1/1967 | Barlow ......................... 137/550 |
| 3,403,696 | 10/1968 | Pynchon . |
| 3,406,715 | 10/1968 | Hrubi, Jr. ..................... 137/550 |
| 4,904,236 | 2/1990 | Redmond et al. ............. 137/854 |
| 5,027,784 | 7/1991 | Osawa et al. ................. 137/854 |
| 5,320,253 | 6/1994 | Robinson ..................... 137/854 |
| 5,526,843 | 6/1996 | Wolf et al. ................... 137/854 |

FOREIGN PATENT DOCUMENTS

| | | |
|---|---|---|
| 2408780 | 6/1979 | France . |
| GM 71 42 425 | 3/1972 | Germany . |
| OS 23 15 870 | 10/1994 | Germany . |

*Primary Examiner*—A. Michael Chambers
*Attorney, Agent, or Firm*—Griffin, Butler, Whisenhunt & Szipl, LLP

[57] ABSTRACT

The invention concerns a back-flow check valve having a flat valve seat with a plurality of openings which are covered by a head of a mushroom-shaped closing member manufactured of a soft-elastic material. A fine mesh sieve is arranged between the head of the closing member and the valve seat for covering the openings. The fine mesh sieve prevents the head from being partially pulled into the openings so that knobs would be formed on an interior surface of the head.

6 Claims, 1 Drawing Sheet

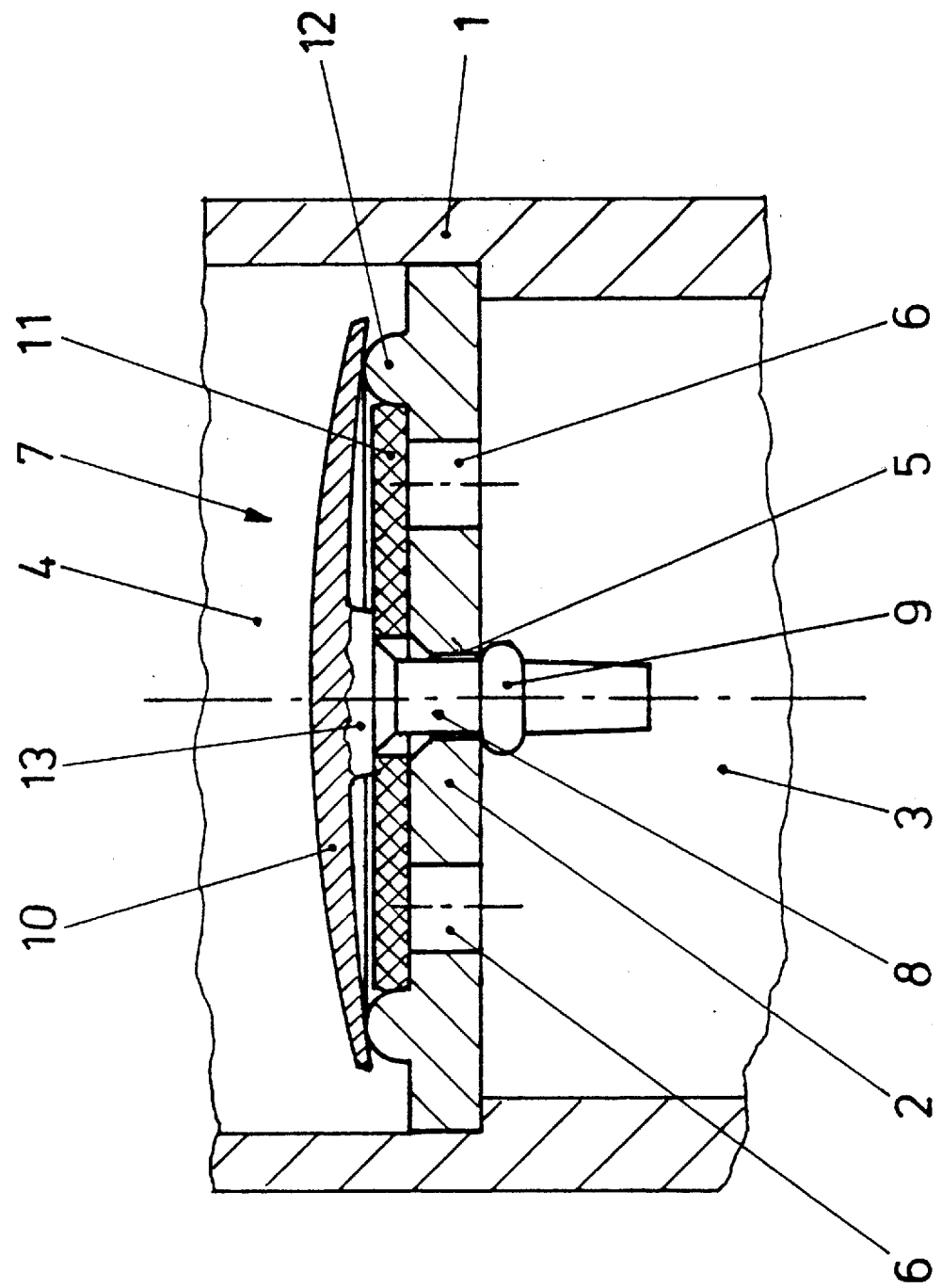

BACK-FLOW CHECK VALVE

BACKGROUND OF THE INVENTION

This invention relates to a back-flow check valve having a flat valve seat with a central passage and a plurality of openings which are radially spaced from the central passage, and with the back-flow valve also including a mushroom-shaped closing member having a stem which is held in the central passage and a head of soft elastic material which covers the radially-spaced openings.

Such valves are used to cut off under pressure lines, such as, for example, in an under pressure fluid amplifier used in a motor vehicle. The following demands, among others, are placed on such a back-flow check valve:

- a switching time must be quite small;
- a seal must be assured; and
- flow noises must not be created, that is, when a medium being controlled is air whistling noises must not be emitted.

If a tough elastic material is used for a closing member, or only for a closing member's head, the seal suffers because the closing member fails to adequately conform to a valve seat and also whistling noises are created. Whistling noises are best prevented by using a soft elastic material for the closing member and the seal is, at least in the beginning, also good; however, the seal will be diminished, after a short time, because a continuous "under pressure" applied to an interior side of the closing member will partially suck the closing member through the openings, so that, after a longer period of use, small knobs are formed on the interior surface of the head of the closing member. Because of this, sealing problems are created, particularly if the sealing member axially rotates a small amount. Further, the shape of the head will be easily deformed so that an outer edge thereof will no longer lie against the valve seat with a uniform force about its perimeter.

A possible remedy can be had by forming the openings to have smaller diameters. However, particularly for injection-molded valve seats, there are rigid limitations in that a die in the extrusion tool for making the openings, because of stability, cannot be too thin.

It is an object of this invention to provide a back-flow check valve of this general type that provides a good seal, does not create whistling noises, allows at least a head of a closing member to be constructed of a soft elastic material while not allowing it to be deformed at holes in a valve seat by being sucked thereinto, and indeed without the openings being made to have very small diameters.

SUMMARY

This object is achieved, according to this invention, by arranging an opening-covering, small-mesh sieve between a head of a closing member and a valve seat, with an outer ring surface of the head lying on the valve seat. The sieve prevents not only a forming of knobs on a bottom side of the head in areas of the openings, but it also creates airflow turbulence which does not create whistling noises.

In a beneficial embodiment of the invention, the sieve is placed in a depression in the valve seat which corresponds to its thickness. In this manner, it is assured that an edge of the head of the closing member lies on the valve seat and not on the sieve. The same benefit is achieved if an outer perimeter of the head of the closing member extends beyond the sieve and lies on a ring-shaped bead protruding out of the valve seat.

Further, it is beneficial for the sieve to be centered outwardly by the ring-shaped extending bead.

In order to assure that the sieve stays in its position not only radially, but also axially, a central shoulder of the head lies on the sieve.

BRIEF DESCRIPTION OF THE DRAWING

The invention is illustrated in the drawing which is a cross-sectional view of a valve of this invention.

DESCRIPTION OF THE PREFERRED EMBODIMENT

A pipe-shaped part 1 is divided by a plate-shaped valve seat 2 into a low pressure side 3 and a suction side 4, the plate-shaped valve seat 2, which can also be dome-shaped, being fixedly mounted and sealed in the pipe-shaped part 1. It has a central passage 5 and a plurality openings 6 radially spaced therefrom on one, or a plurality of concentric circles. A one-piece closing member 7, constructed of soft elastic material, has a mushroom-shape, with its stem 8 being fixedly mounted, at least in an axial direction, in the central passage 5. In this regard, the stem 8 has a beaded thickening 9 which engages an underside of the plate-shaped valve seat 2 with a bias.

A fine mesh sieve 11 is arranged on the valve seat 2, between the valve seat and the head 10 of the mushroom-shaped closing member 7, to lie on the valve seat 2 with a central shoulder 13 of the head 10 pressing against it. The sieve 11 is in the form of a circular ring sheet and of a size that all of the openings 6 are covered by it. The sieve 11 is centered outwardly by a ring-shaped extending bead 12 which protrudes from the valve seat 2, and which forms an actual seat surface on which a circular-shaped outer area of the head 10 of the closing member sealingly lies.

The invention claimed is:

1. A back-flow check valve having a flat valve seat defining a central passage and a plurality of radially-spaced openings, and having a mushroom-shaped closing member with a stem which is mounted and held in the central passage and with a head of soft elastic material which covers the radially-spaced openings, wherein a fine mesh sieve is arranged between the head of the closing member and the valve seat for covering the radially-spaced openings, with an outer ring surface of the head lying on the valve seat.

2. A back-flow check valve according to claim 1 wherein the sieve is placed in a depression of the valve seat which corresponds to a thickness of the sieve.

3. A back-flow check valve as in claim 1 wherein an outer perimeter portion of the head of the closing member extending beyond the sieve lies on a ring-shaped extending bead protruding out of the valve seat.

4. A back-flow check valve as in claim 3 wherein the sieve is centered outwardly by the ring-shaped extending bead.

5. A back-flow check valve as in claim 1 wherein the sieve has a circular shape in its breadth.

6. A back-flow check valve as in claim 5 wherein the head has a central shoulder which lies against the sieve.

* * * * *